United States Patent
Powers et al.

(10) Patent No.: US 8,107,101 B2
(45) Date of Patent: Jan. 31, 2012

(54) APPARATUS AND METHOD FOR EVALUATING RFID PROGRAMMING

(75) Inventors: Evan James Powers, Lexington, KY (US); Mark Stephen Underwood, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1066 days.

(21) Appl. No.: 11/611,251

(22) Filed: Dec. 15, 2006

(65) Prior Publication Data

US 2008/0144083 A1    Jun. 19, 2008

(51) Int. Cl.
*G06F 15/00*    (2006.01)

(52) U.S. Cl. ...... 358/1.14; 358/1.1; 358/1.12; 358/1.15; 715/255; 340/572.1

(58) Field of Classification Search ............... 358/1.14, 358/1.1, 1.12, 1.15; 715/255; 340/572.1
See application file for complete search history.

(56) References Cited

U.S. PATENT DOCUMENTS

| | | | |
|---|---|---|---|
| 6,585,154 B1 * | 7/2003 | Ostrover et al. | 235/375 |
| 6,827,279 B2 * | 12/2004 | Teraura | 235/492 |
| 7,268,906 B2 * | 9/2007 | Ruhl et al. | 358/1.15 |
| 7,495,792 B2 * | 2/2009 | Snowdon et al. | 358/1.16 |
| 7,594,115 B2 * | 9/2009 | Ikeda | 713/170 |
| 7,649,641 B2 * | 1/2010 | Fujinuma | 358/1.14 |
| 2004/0044956 A1 * | 3/2004 | Huang | 715/511 |
| 2005/0166094 A1 * | 7/2005 | Blackwell et al. | 714/38 |
| 2005/0218219 A1 * | 10/2005 | Sano et al. | 235/383 |
| 2005/0230479 A1 * | 10/2005 | Chapman et al. | 235/462.13 |
| 2007/0029386 A1 * | 2/2007 | Jessup | 235/440 |
| 2007/0236720 A1 * | 10/2007 | Tamada et al. | 358/1.14 |
| 2008/0030746 A1 * | 2/2008 | Matsunaga et al. | 358/1.1 |
| 2008/0123128 A1 * | 5/2008 | Powers et al. | 358/1.15 |

* cited by examiner

*Primary Examiner* — Mark K Zimmerman
*Assistant Examiner* — Mark Milia

(57) ABSTRACT

The present disclosure relates to a printing system or method for evaluating the programming of an identifier, such as an RFID tag. The method may be implemented in a printing device which is capable of programming an identifier and reading data from the identifier and comparing such information to evaluate the programming operation.

18 Claims, 4 Drawing Sheets

APPARATUS AND METHOD FOR EVALUATING RFID PROGRAMMING

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates to printers and printing systems. More particularly, the disclosure relates to an apparatus and method for evaluating the programming of an identifier on print media, such as an RFID tag, within a printing device.

2. Description of the Related Art

Inkjet and laser printers have become commonplace equipment in most workplace and home computing environments. Today, many printers are multi-functional assemblies capable of printing on a large array of print media including letterhead, paper envelopes and labels. A recent innovation in the printing industry involves the manufacturing of print media with embedded radio frequency signatures in the form of Radio Frequency Identification (RFID) transponders or tags. These tags, sometimes called "Smart Labels", may be used with a variety of existing printing methods.

Embedded print media may include a backing material (sometimes referred to as the "web") upon which a label is applied, with a RFID tag sandwiched in between the label and the backing material. There may be one or more labels on the web and the sheet, as presented, may be part label and part plain paper. In some cases there may be more than one tag arrayed across the width and down the length of the media such that multiple columns and/or rows of tags are contained on the print media.

Printing on media with embedded RFID tags is rapidly becoming a growing area of label printing. Each tag on a sheet can be printed with certain data, and the RFID tag embedded within that media can be used to allow individualized processing of user associated data. For example, a shipping label might have the delivery address and a package tracking ID printed on it, while the corresponding tag would be programmed with the same information. The delivery information may then be read from the tag, whether or not the package is positioned so that the tag is visible.

Field service personnel are often required to verify that a printing device is working properly before, during and after a repair has been made. However, an RFID enabled printing device may pose particular problems for the technician. For example, while print defects introduced by a malfunctioning printer may be readily visible, it may be difficult to determine whether an RFID tag has been successfully programmed.

SUMMARY OF THE DISCLOSURE

In accordance with one exemplary embodiment, the present disclosure relates to a printing system for media containing one or a plurality of identifiers including a processor capable of forwarding programming data in a first print job to an identifier, reading data from the identifier in response to a second print job and comparing the data from the identifier with the programming data. Based upon such comparison, the processor may generate an error signal or approval signal.

In accordance with another exemplary embodiment, the present disclosure relates to a method for evaluating the operation of a printing device. The method includes forwarding programming data in a first print job to an identifier, reading data from the identifier in response to a second print job and comparing the data from the identifier with the programming data. Based upon such comparison, an error signal or approval signal may be generated.

In another exemplary embodiment, the present disclosure relates to an article comprising a storage medium having stored thereon instructions that when executed by a machine result in the following: forwarding programming data in a first print job to an identifier, reading data from the identifier in response to a second print job, and comparing the data from the identifier with the programming data.

BRIEF DESCRIPTION OF THE DRAWINGS

The above-mentioned and other features and advantages of this disclosure, and the manner of attaining them, will become more apparent and the disclosure will be better understood by reference to the following description of embodiments of the disclosure taken in conjunction with the accompanying drawings, wherein.

DETAILED DESCRIPTION

Figure 1:
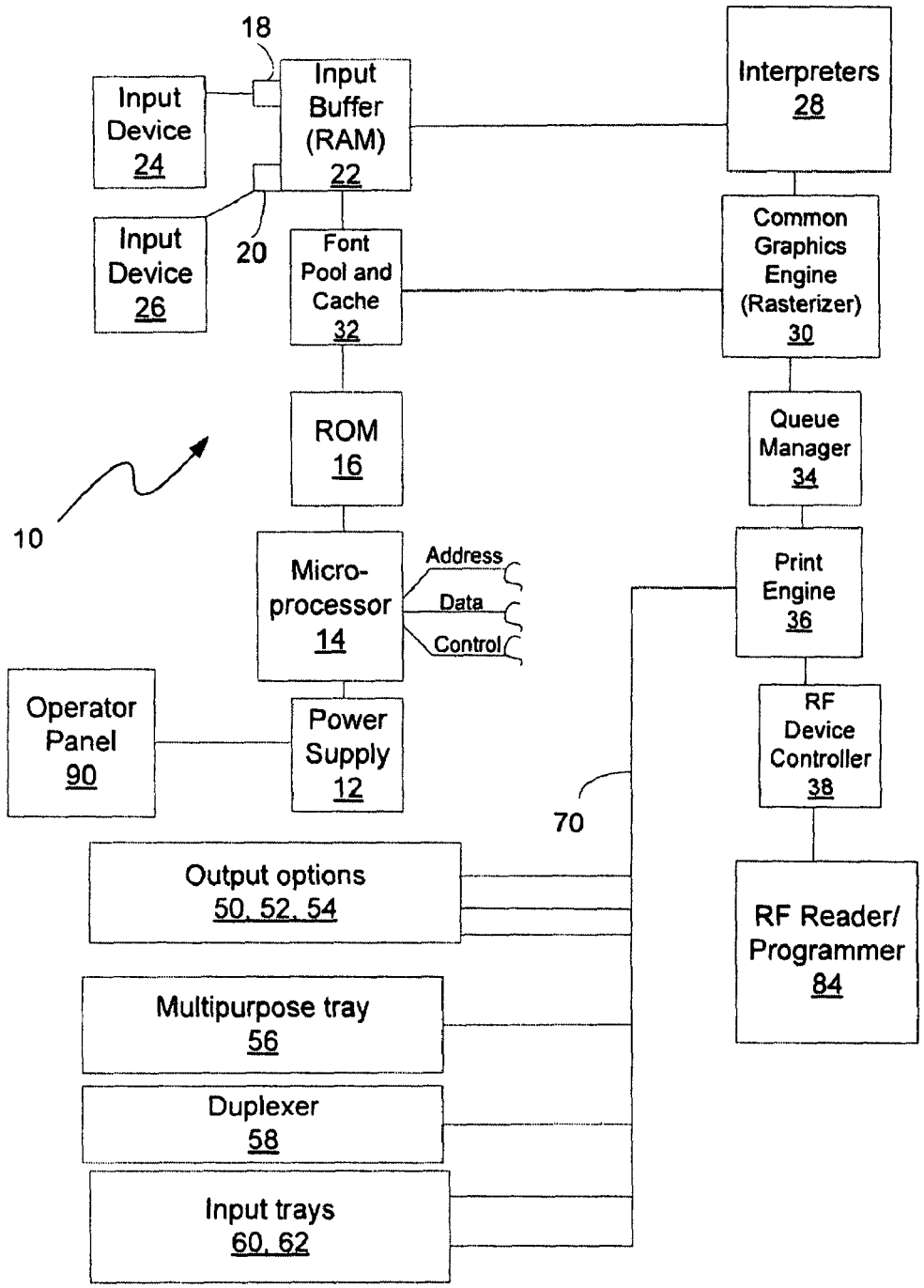
FIG. 1 is a block diagram of an embodiment of an exemplary printing system in accordance with the present invention.

It is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

For simplicity the discussion below will use the terms "media," "sheet" and/or "paper" to refer to a discrete unit of media. It should be understood, however, that this term is not limited to paper sheets, and any form of discrete media is intended to be encompassed therein, including without limitation, envelopes, transparencies, postcards, labels, and the like. The disclosure herein also applies to printing devices such as an electrophotographic printer, an inkjet printer, a fax device, a copier, an all-in-one device, an RFID printer or a multipurpose device.

Referring now to the drawings, FIG. 1 shows a hardware block diagram of an exemplary printing system, generally designated by the reference numeral 10, which may be evaluated and tested in accordance with the methods described herein. Printing system 10 may contain certain components, such as a DC power supply 12 that may have multiple outputs of different voltage levels, a microprocessor 14 having address lines, data lines, and control and/or interrupt lines, Read Only Memory (ROM) 16, and Random Access Memory (RAM), which may be divided by software operations into several portions for performing several different functions.

Printing system 10 may also contain at least one serial input or parallel input port, network or USB port, or in many cases both types of input ports, as designated by the reference numeral 18 for the serial port and the reference numeral 20 for the parallel port. Each of these ports 18 and 20 may be connected to a corresponding input buffer, generally designated by the reference numeral 22 on FIG. 1. Serial port 18 may be connected to a serial output port of a personal computer or a workstation that may contain a software program such as a word processor or a graphics package or computer aided drawing package. Similarly, parallel port 20 may be connected to a parallel output port of the same type of personal computer or workstation containing similar types of programs. Such input devices are designated, respectively, by the reference numerals 24 and 26 on FIG. 1.

Once the text of graphical data has been received by input buffer 22, it may be communicated to one or more interpreters designated by the reference numeral 28. A common interpreter is PostScript™, which is an industry standard used by some laser printers. After being interpreted, the input data may be sent to a common graphics engine to be rasterized, which may occur in a portion of RAM designated by the reference numeral 30 on FIG. 1. To speed up the process of rasterization, a font pool and possibly also a font cache may be stored, respectively, in ROM or RAM within most laser printers, and these font memories are designated by the reference numeral 32 on FIG. 1. Such font pools and caches may supply bitmap patterns for common alphanumeric characters so that the common graphics engine 30 can easily translate each such character into a bitmap using a minimal elapsed time.

Once the data has been rasterized, it may be directed into a Queue Manager or page buffer, which may be a portion of RAM designated by the reference numeral 34. In a typical laser printer, an entire page of rasterized data may be stored in the Queue Manager during the time interval that it takes to physically print the hard copy for that page. The data within the Queue Manager 34 may be communicated in real time to a print engine designated by the reference numeral 36. Print engine 36 may include a laser light source within its printhead (not shown), and its output may be the physical marking on a piece of paper, which may be the final print output from printing system 10.

In some embodiments, the address, data, and control lines may be grouped in buses, which are electrically conductive pathways that are physically communicated in parallel (sometimes also multiplexed) around the various electronic components within printing system 10. For example, the address and data buses may be sent to all ROM and RAM integrated circuits and the control lines or interrupt lines may be directed to all input or output integrated circuits that act as buffers.

Print engine 36 may contain the core print logic which may be embodied in an Application Specific Integrated Circuit (ASIC) (not shown), for example, and which may act as the printing device's primary controller and data manipulating device for the various hardware components within the print engine 36. The bitmap print data arriving from Queue Manager 34 may be received by the core print logic, and at the proper moments may be sent in a serialized format to the laser printhead.

The print engine 36 may be in communication with a number of paper-handling devices via a communications bus 70. Some of the paper-handling devices depicted on FIG. 1 may include output options 50, 52, 54, a multipurpose tray 56, a duplexer 58, and input trays 60 and 62. The output options may vary depending on the particular finish functionality provided by the printing system 10. Examples of output options may include, but are not limited to, a single output bin, a 5-bin multi-bin stacker and/or a single bin stapler finishing option.

Print engine 36 may also be in communication with a number of RFID devices. For example, an RF device controller 38 may be included that may be configured to communicate and/or control a variety of RF devices associated with system 10. One such device may be an RF reader/programmer 84, which is discussed in further detail below with reference to FIG. 2.

Each input tray 60, 62 may be configured to hold media, which may contain one or more identifiers. An identifier as described herein may therefore by understood to include, e.g., an RFID transponder, an RFID tag (e.g., active, passive and/or semi-passive), a "smart card", a "smart label", a microchip/antenna package, a "chipless" RFID tag, or any other programmable identification device. A "chipless" RFID tag (e.g., RF fibers) may not make use of any integrated circuit technology to store information. The tag may also use fibers or materials that reflect a portion of a reader's signal back and such unique return signal may then be used as for identification purposes.

It may therefore be appreciated that within each input tray, and as between input trays, the media may have different types of RFID tags, each intended to have, or having, its own programmed data which tag may then communicate via the use of radio waves. Furthermore, as noted above, the RFID tags may differ with respect to whether or not the tags are a passive tag, which may be understood as those tags that are ultimately powered by an RFID reader/programmer, or an active tag, in which case the RFID tag may have its own power source. Passive RFID tags may make use of a coiled antenna that may create a magnetic field using the energy provide by the reader's carrier signal. The RFID tags may also be a semi-passive tag, which have a power source (e.g. a laminar, flexible relatively low cost battery) which may be used for on tag sensing. The RFID tags may also be a read only tag that contains a unique programming that cannot be changed, or a write once read many (WORM) tag that may enable users to encode tags at the first instance of use wherein the code may then become locked. The RFID tags may also be a read/write tag that allows for updated or new information to be written to the tag. As discussed more fully below, printing system 10 may be configured to determine whether an RFID tag has been programmed successfully.

Within each input tray 60, 62, and as between input trays, the media may have a different number of tags. With respect to media having the same number of tags, the tags may be arranged at different locations. For example, one media type may have a single tag located in the center of the page near the leading edge. A different media type may have two tags, one in the upper left corner and the other at mid-page on the right side. It may also be appreciated that as between input trays, the nature of the media in which the RFID tags may be embedded may differ. For example, the media may be paper, label, cardstock, transparencies, etc. System 10 may be used to select a media input source (e.g., trays 60 and/or 62) for printing RFID media. Although only two input trays are shown, it is contemplated that any number of input sources may be used in accordance with the present disclosure.

Printing system 10 may also include at least one paper or other type of print media positioning sensor. In some cases, the paper positioning sensors may be optoelectronic devices, which have a light source that may be a light emitting diode (LED). This may allow for sensing the position of a sheet of paper or other print media and may provide a method of determining when the leading edge or trailing edge of a sheet of print media has reached a particular point along the media pathway. Furthermore, many different types of sensors may be used other than optoelectronic devices (e.g., a limit switch to detect whether or not the printer cover is closed) without departing from the principles of the present disclosure.

Figure 2:
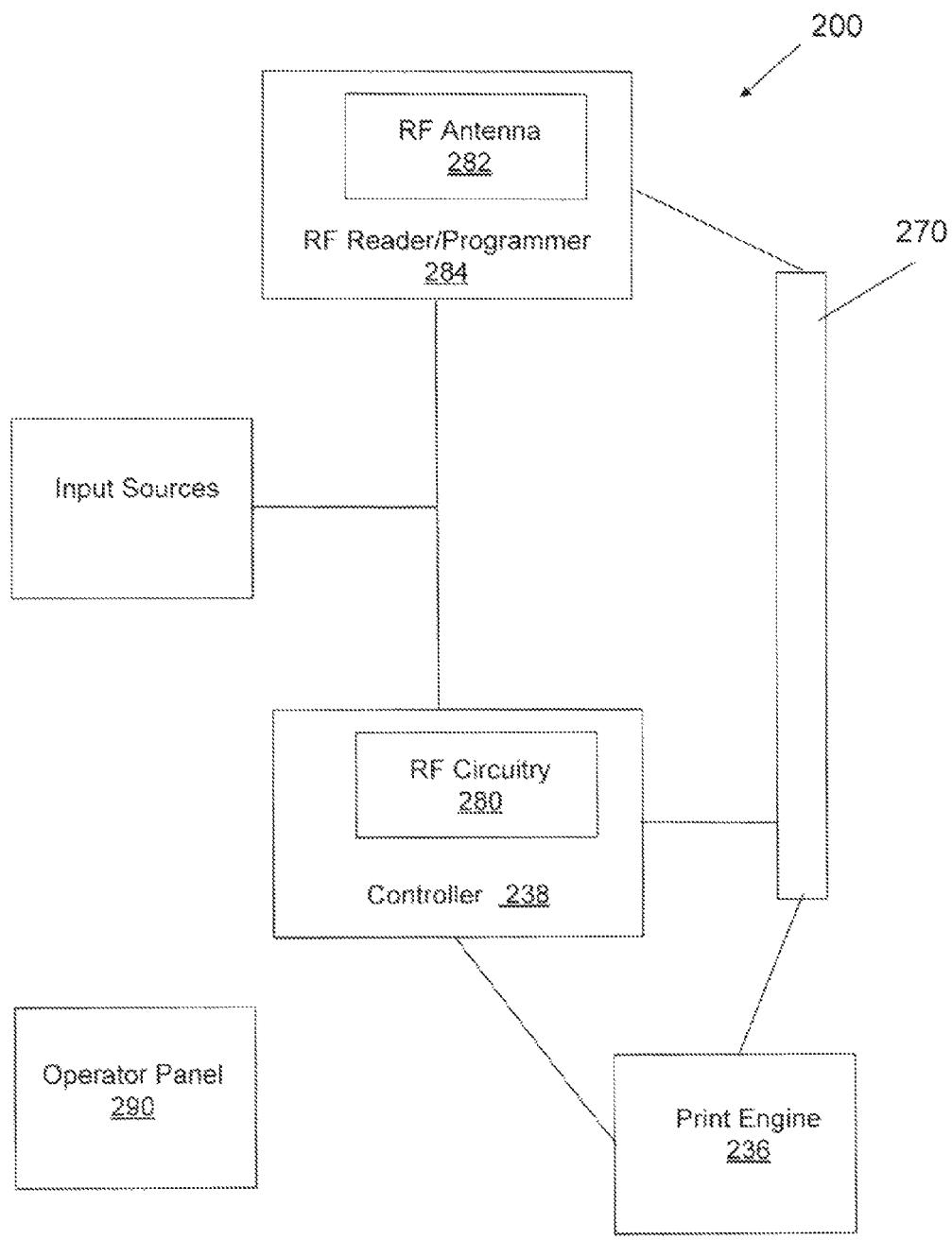
FIG. 2 is a block diagram of another exemplary embodiment of a printing system showing in greater detail a portion of a printing system having radio frequency components.

FIG. 2 illustrates an exemplary embodiment showing further detail of a printing system 200. System 200 may include a print engine 236, a control 238, communications bus 270 a RF reader/programmer 284 and/or an operator panel 290. RFID reader/programmer 284 may be used to interrogate an identifier, such as an RFID tag. Reader/programmer 284 may include an antenna 282 that may emit radio waves of various frequencies. RF antenna 282 may be a conductive element that may be used by RF reader/programmer 284 to read and/or program an identifier (e.g., a radio frequency device tag) as well as to conform whether an identifier is working or defective. Antenna 282 may in communication with an identifier, which may respond by transmitting data back to antenna 282. This data may be transmitted in accordance with a variety of different communication protocols having different frequency ranges. A number of factors may affect the distance at which a tag can be read (i.e., the read range). The frequency used for identification, the antenna gain, the orientation and polarization of the reader antenna and the transponder antenna, as well as the placement of the identifier on an object to be identified may all have an impact on the read range of system 200.

In some embodiments, radio frequency control circuitry 280 may attempt to read and/or program a tag embedded in the media and then note the success or failure of this attempt. The radio frequency control circuit 280 may then monitor or "listen" on its communications port to track the page's location as it moves through the printer. It is contemplated that controller 238 may be packaged into an aftermarket option that may be installed in a printer, such as printing device 10, without modification of the printer's other essential systems such as print engine 236 including the core print logic.

Printing device 10 may include test routines that may be capable of detecting certain failures or errors within printing device 10. Some of these errors may include, but are not limited to, an inability to communicate with RF reader/programmer 284, or an indication of a problem with antenna 282 forwarded from reader/programmer 284. Printing device 10 may include firmware having check routines that may validate the data passed down from a print job. These check routines may also be capable of detecting instances of data corruption or other internal errors. In an error is detected an error message may be presented to operator panel 290, which may present descriptive debug information for a repair technician.

In one exemplary embodiment, a technician may utilize a number of print jobs in order to test printing system 10. For example, two single-page print jobs written in any language understood by the printer (e.g., PCL) and a single sheet of RFID media may be used. The first print job supplied may contain a "write" command with programming data (e.g., a known data packet) to be forwarded to the identifier on the media. By forwarding it is to be understood that the programming data is sent to the identifier, but as contemplated herein, it remains to be evaluated as to whether or not such programming data is properly transferred to the identifier. Accordingly, the second supplied job may contain a "verify" command that contains the same known data packet. The technician may therefore first load the single sheet of media into an input source (e.g., input tray 60) and send the first print job. Printing system 10 may then feed the media from input trays 60 and/or 62 and attempt to program the identifier with the known data packet.

The technician may then remove the printed page from output bin (e.g., 50, 52, and/or 54) and return it to input tray 60 or 62. The second print job may then be sent. This print job may command printing device 10 to feed the printed page, read the data (if any) on the identifier, and compare it to the expected value encoded in the print job (i.e., programming data). Accordingly, if no data is read, or if the data read from the identifier does not correspond to the data that was programmed to the identifier an error code may be generated and noted on operator panel 290. It may therefore be appreciated that such an error code may be generated when the data read from the identifier indicates that it will not properly perform as intended and provide, e.g., the programmed identification data when utilized as, e.g., as RFID tag. Similarly, if the data read from the identifier corresponds to the data that was programmed to the identifier, such that the identifier can be expected to properly perform as intended and provide programmed identification data when utilized as, e.g., an RFID tag, an approval code may be generated and again sent to the operator panel.

Printing system 10 or 200 may also include a duplex unit 58. A duplex unit may be understood as a unit that may provide for multiple (e.g. at least two) passes of media through all or a portion of the printer before the media may be sent to an output tray. Accordingly, the two print jobs may be combined into a single print job with, e.g., the "write to identifier" occurring on the first pass through device 10 and the "read/verify" occurring on the second pass of the media through device 10. The presence of a duplex unit 58 may therefore simplify the procedure for the technician or end user.

Figure 3:
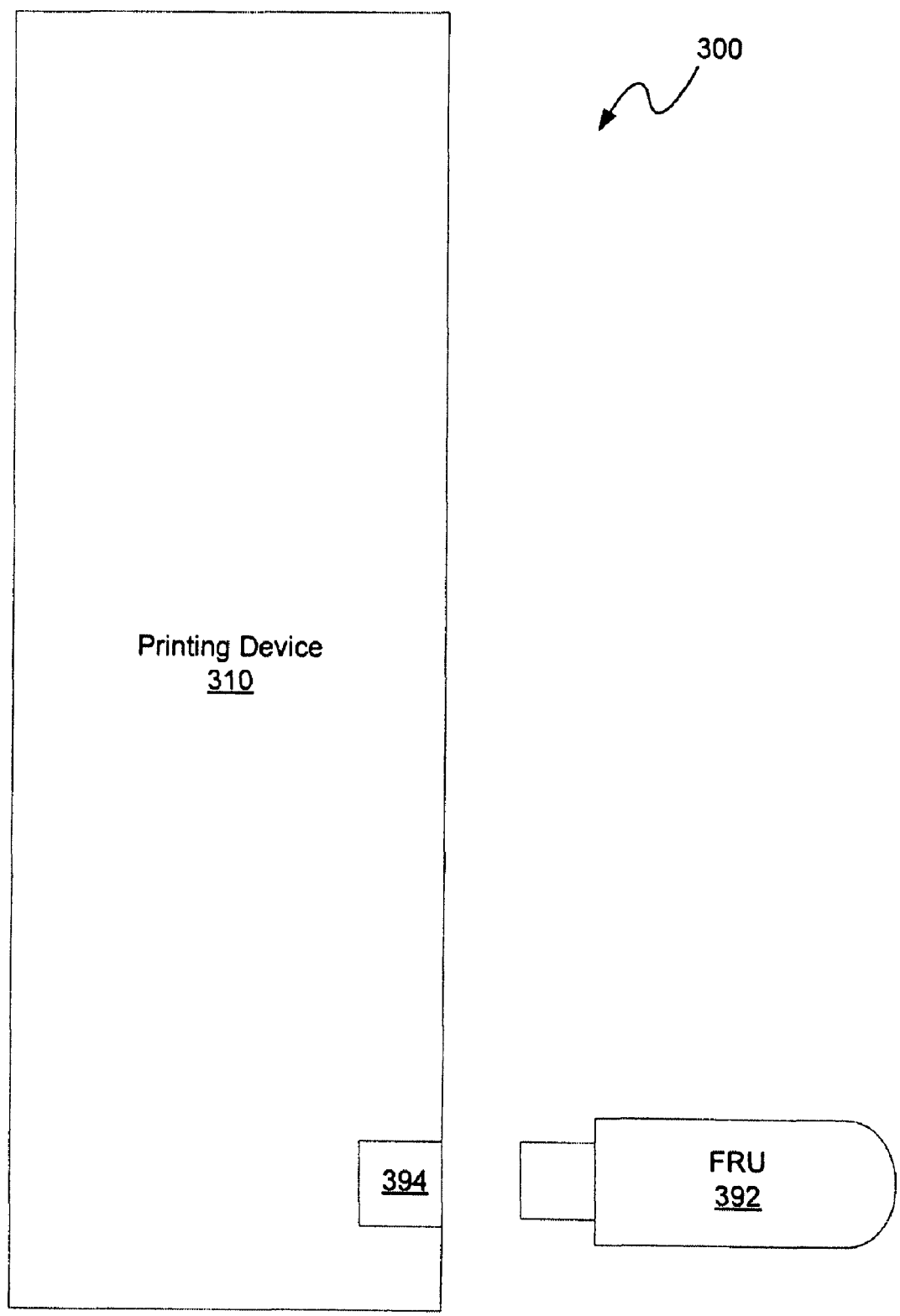
FIG. 3 is a block diagram of yet another exemplary embodiment of the present disclosure.

Referring now to FIG. 3, another exemplary embodiment 300 is provided. In this embodiment, the above referenced print jobs may be provided to the technician in a portable storage device such as a flash memory device or USB type "thumb drive" which may interface with printer USB port 394. The technician may also be provided with test media containing an identifier to be programmed. Accordingly, the flash memory device may store one print job having identifier programming data and a second print job having a read command. It may also include programming that may provide a comparison of the data from the identifier with the programming data which programming may generate an error code or approval code based upon the results of such comparison. Using this approach, a technician may test the proper operation of printing device 310 when programming and reading identifiers (e.g. RFID tags) without the need for a separate external RFID reader, such as a handheld RFID reader.

In some embodiments, any one of the above referenced print jobs may be embedded in the printer firmware itself (similar to a demo page) and may be called up via a special diagnostic menu. Moreover, printing device 10, when configured in a diagnostic mode, may provide step-by-step instructions to the technician or end user, allowing such user to perform the test and possibly provide the results to remote test personnel. These instructions may be provided via a graphical user interface, such as operator panel 290.

It can now be appreciated that the system 10 and/or 200 may include a display, such as operator panel 90, which may show a graphical representation of a given sheet of media indicating whether or not an identifier has been properly programmed. For example, panel 90 may provide the technician with troubleshooting instructions or other information if the data from the identifier does not correspond to an expected value. Furthermore, the size and/or position of RFID tags present on the media of a given input source may be made visible using operator panel 90. Operator panel 90 may then provide a user with the option of selecting or canceling the particular print job. Various displays are therefore contemplated, such as, for example, an all-points addressable display panel.

Figure 4:
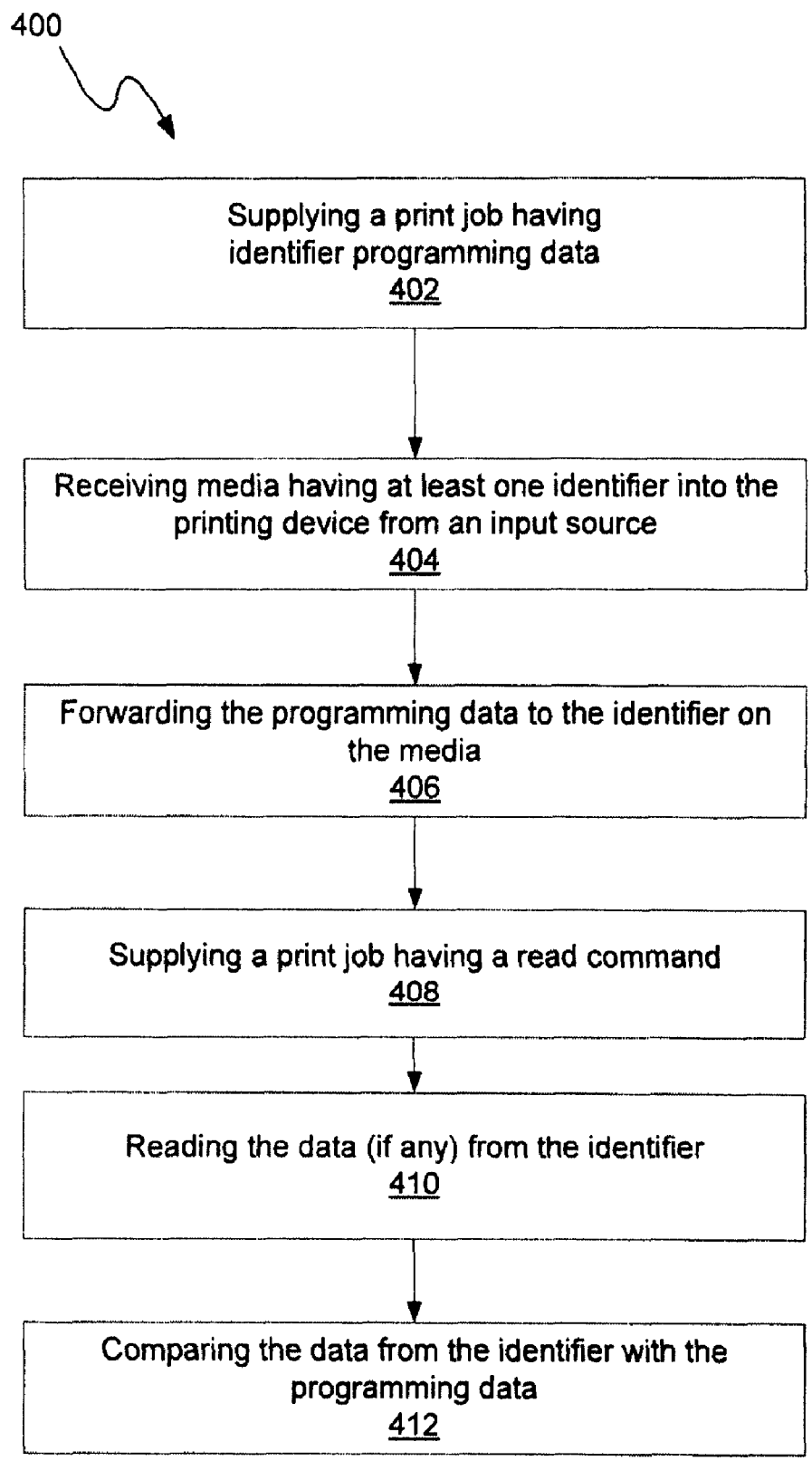
FIG. 4 is a flow diagram showing an exemplary method in accordance with the present disclosure.

FIG. 4 provides a descriptive flow diagram 400 depicting one example of the present disclosure providing a method for evaluating a printing device. A processor may also be supplied which may implement any of the indicated steps, where the processor may be a separate component from the printer or be part of the printer. As illustrated, the method of evaluating a given RFID enabled printer may therefore include at 402 the supply of a print job having identifier programming data. It should be understood that reference to supply of a print job herein may be understood as supplying a print job from memory, or formulating and generating a print job based upon user input. Media may then be received in the printing device having at least one identifier (404) and the method may then attempt to program data to the identifier on such media (406). A print job having a read command may then be supplied (408) followed by reading the data (if any) from the identifier at 410 and comparing the data from the identifier with any such programming data (412) to provide the above referenced "error" or "approval" designations.

As used in any embodiment described herein, "circuitry" may comprise, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

It should now also be clear that embodiments of the methods described above may be implemented in a computer program that may be stored on a storage medium having instructions to program a system to perform the methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

It should be understood that modifications can be made to the disclosure in light of the above detailed description. The terms used in the following claims should not be construed to limit the disclosure to the specific embodiments disclosed in the specification and the claims. Rather, the scope of the disclosure is to be determined entirely by the following claims, which are to be construed in accordance with established doctrines of claim interpretation.

What is claimed is:

1. A printing system for media containing one or a plurality of programmable identifiers, the system comprising a processor capable of executing instructions for:
    forwarding programming data in a first print job to an identifier and programming the identifier based upon the programming data;
    automatically reading data from the identifier in response to a second print job;
    comparing the data from the identifier with the programming data; and
    indicating to a user a result of the comparison, wherein the printing system comprises a printer for printing images onto sheets of media, the first print job and the second print job are combined by the processor into a single print job, the identifier is located in or on a first sheet of the sheets of media, and wherein the forwarding, reading, comparing and indicating are performed by the printer before the first sheet is provided to the user;
    wherein the printer includes a duplex unit, and the processor causes the first sheet of media containing the identifier to pass through the duplex unit prior to the reading of the data from the identifier so that the programming is performed in a first pass of the first sheet through the printer and the reading is performed in a second pass of the first sheet through the printer using the duplex unit.

2. The printing system of claim 1 wherein said indicating comprises generating an error code based upon said comparing of said data from the identifier with said programming data.

3. The printing system of claim 1 wherein said indicating comprises generating an approval code based upon said comparing of said data from the identifier with said programming data.

4. The printing system of claim 1 wherein said identifier comprises an RFID tag.

5. The printing system of claim 1 wherein said printing system comprises a printer selected from the group consisting of electrophotographic printer, an inkjet printer, a fax device, a copier, an all-in-one device, an RFID printer or a multipurpose device.

6. The system of claim 1, wherein the first print job and the second print job are maintained in the printer and called up when the printer is in a diagnostic mode of operation.

7. The method of claim 1, further comprising maintaining the first and second print jobs in the printing device, and calling the first and second print jobs when the printing device is in a diagnostic mode of operation.

8. A method comprising:
    forwarding programming data in a first print job to an identifier and programming the identifier;
    reading data from the identifier in response to a second print job; and
    comparing the data from the identifier with the programming data, wherein the forwarding, reading and comparing are performed within a printing device;
    wherein the printing device includes a duplex path, the identifier is disposed in a media sheet, the forwarding and programming are performed during a first pass of the media sheet through the printing device and the reading is performed during a second pass of the media sheet through the printing device, the media sheet passing through the duplex path during the second pass.

9. The method of claim 8 further comprising generating an error code based upon said comparing of said data from the identifier with said programming data.

10. The method of claim 8 further comprising generating an approval code based upon said comparing of said data from the identifier with said programming data.

11. The method of claim 8 wherein said print job having identifier programming data and said print job having a read command are combined by the printing device into a single print job.

12. The method of claim 8 wherein said identifier comprises an RFID tag.

13. The method of claim 8 wherein printing device is selected from the group consisting of an electrophotographic printer, an inkjet printer, a fax device, a copier, an all-in-one device, an RFID printer or a multipurpose device.

14. An article comprising a non-transitory storage medium having stored thereon instructions that when executed by a machine result in the following:

receiving a first print job and a second print job;

combining the first and second print jobs into a single print job;

forwarding programming data in the first print job to an identifier and programming the identifier based upon the programming data;

reading data from the identifier in response to the second print job;

comparing the data from the identifier with the programming data; and indicating to a user a result of the comparison, wherein the machine comprises a printer for printing images onto sheets of media, and wherein the forwarding, reading, comparing and indicating are performed by the printer before the identifier is provided to a user of the printer;

wherein the identifier is located in a sheet of media, the forwarding and the programming occur in a first pass of the sheet of media through the printer and the reading occurs in a second pass of the sheet of media through the printer.

15. The article of claim 14 wherein the indicating comprises generating an error code based upon said comparing of said data from said identifier with said programming data.

16. The article of claim 14 wherein the indicating comprises an approval code based upon said comparing of said data from said identifier with said programming data.

17. The article of claim 14 wherein said identifier comprises an RFID tag.

18. The article of claim 14, wherein the second pass of the media sheet through the printer is effectuated with a duplex path of the printer.

* * * * *